United States Patent

Geertman

Patent Number: 5,897,680
Date of Patent: Apr. 27, 1999

[54] METHOD OF MAKING A TWISTED OPTICAL FIBER WITH LOW POLARISATION MODE DISPERSION

[75] Inventor: Robert E.M. Geertman, Veldhoven, Netherlands

[73] Assignee: Plasma Optical Fibre B.V., Eindhoven, Netherlands

[21] Appl. No.: 08/698,641

[22] Filed: Aug. 16, 1996

[30] Foreign Application Priority Data

Aug. 16, 1995 [EP] European Pat. Off. ............. 95202216

[51] Int. Cl.⁶ .................................. C03B 37/027
[52] U.S. Cl. ................... 65/402; 65/504; 57/293; 57/294
[58] Field of Search .............. 65/402, 430, 535, 65/504; 57/293, 294

[56] References Cited

U.S. PATENT DOCUMENTS

| 2,476,298 | 7/1949 | Heizer | 57/293 |
| 3,377,792 | 4/1968 | Walls | 57/293 |
| 3,762,142 | 10/1973 | Rasmussen | 57/293 |
| 4,028,081 | 6/1977 | Marcatili | 65/402 |
| 4,427,717 | 1/1984 | Gauthier | 65/402 |
| 4,712,365 | 12/1987 | Ferre | 57/293 |
| 5,092,117 | 3/1992 | Paivinen | 57/293 |
| 5,298,047 | 3/1994 | Hart, Jr. et al. | |
| 5,418,881 | 5/1995 | Hart | 65/438 |

FOREIGN PATENT DOCUMENTS

0582405A1  2/1994  European Pat. Off. .

OTHER PUBLICATIONS

C.G. Askins et al, "Technique for controlling the Internal Rotation of Principal Axes in the Fabrication of Birefringent Fibers", IEEE Journal of Lightwave Technology, vol. 6, No. 9, Sep. 1988, pp. 1402–1405.

*Primary Examiner*—John Hoffmann
*Attorney, Agent, or Firm*—Seed and Berry LLP

[57] ABSTRACT

A method of manufacturing an optical fiber, whereby a fiber is drawn from a molten extremity of a preform and is subsequently subjected to a torque, thereby causing a portion of the fiber to be twisted about its longitudinal axis and to be endowed with a spin. The torque is applied by running the fiber between a pair of wheels which rotate in mutually opposite senses about two different rotational axes, each wheel having a peripheral curved surface, the wheels being thus arranged that the fiber runs substantially tangential to their curved surfaces and is pressed therebetween, the wheels being moved back and forth relative to one another in a direction substantially perpendicular to the fiber so as to cause the fiber to be rolled back and forth between their curved surfaces.

6 Claims, 3 Drawing Sheets

METHOD OF MAKING A TWISTED OPTICAL FIBER WITH LOW POLARISATION MODE DISPERSION

BACKGROUND OF THE INVENTION

The invention relates to a method of manufacturing an optical fiber, whereby a fiber is drawn from a molten extremity of a preform and is subsequently subjected to a torque, thereby causing a portion of the fiber to be twisted about its longitudinal axis and to be endowed with a spin.

The invention also relates to an optical fiber comprising a core portion which is surrounded by an optical cladding portion, itself surrounded by a protective coating. In particular, the invention relates to an optical fiber of this type having low polarisation mode dispersion.

The term Polarisation Mode Dispersion (PMD) refers to the dispersion of a signal propagating through an optical fiber (particularly a single mode fiber), as a result of birefringence in the fiber's core portion. This birefringence is generally caused by imperfections in the fiber, such as slight non-circularity of its core cross-section, asymmetrical lateral stress, etc., and manifests itself in dissimilar effective refractive indices for the carried signal's two orthogonal polarisation modes. In the case of a perfect fiber devoid of PMD, these two modes propagate independently of one another at a common velocity. However, in the presence of PMD, a sizeable phase difference can accumulate between the two modes.

A known method of combatting PMD is to deliberately twist the warm fiber as it is drawn from the preform, so that a mechanical spin becomes "frozen" into the fiber as it cools. The resulting stress in the fiber produces continual mode-coupling between the orthogonal polarisation modes of a carried signal, thereby inhibiting the accumulation of a significant phase lag between the two modes, and consequently causing a significant reduction in the fiber's PMD.

A method as specified in the opening paragraph is known from United States Patent U.S. Pat. No. 5,298,047, wherein the drawn fiber is caused to pass over a pulley whose rotational axis can be canted, so that the pulley can be caused to rock back and forth about an axis perpendicular to its rotational axis. The pulley has a cylindrical surface which is bounded along both circular edges by a protrusive retaining flange, the moving fiber passing between these two flanges. The rocking motion of the pulley produces a twist in the fiber along a substantial portion of its length. In particular, portions of warm fiber which are twisted in this manner will become endowed with a permanent twist (spin) as their constituent material subsequently cools.

The cited document stipulates that the spin imparted to the fiber ideally has a non-constant spatial frequency. This can be achieved by canting the pulley back and forth in a non-periodic manner. In this way, the described method aims to achieve a PMD of less than 0.5 ps/km$^{1/2}$.

The known method has a number of drawbacks. For example, despite the presence of the retaining flanges, the moving fiber can easily slip off the canting pulley, especially at high drawing speeds. For this reason, both the canting angle θ and the canting frequency must be kept relatively small, which in turn substantially limits the extent to which the fiber can be twisted. Moreover, the canting motion of the pulley causes excessive vibration of the moving fiber, leading to coating inaccuracies, for example. Such problems can generally only be alleviated with the aid of additional stabilisation pulleys. In addition, the requirement that the pulley be canted back and forth in a non-periodic manner generally necessitates relatively non-straightforward actuation means, such as an actuator which is governed by an electronic random number generator, for example.

SUMMARY OF THE INVENTION

It is an object of the invention to alleviate these problems. In particular, it is an object of the invention to provide a method with which it is possible to impart a very large spin to the fiber in a very controlled and uniform manner, with negligible risk of fiber slip. In addition, it is an object of the invention that such a method should entail no untoward vibration of the fiber. Moreover, it is an object of the invention that the new method should be such as to allow a uniformly periodic spin to be imparted to the fiber, while still achieving very significant PMD reduction.

These and other objects are achieved in a method as described in the opening paragraph, characterised in that the torque is applied by running the fiber between a pair of wheels which rotate in mutually opposite senses about two different rotational axes, each wheel having a peripheral curved surface, the wheels being thus arranged that the fiber runs substantially tangential to their curved surfaces and is pressed therebetween, the wheels being moved back and forth relative to one another in a direction substantially perpendicular to the fiber so as to cause the fiber to be rolled back and forth between their curved surfaces.

The term "wheel" as here employed should be interpreted in a broad sense, and is intended to encompass such objects as wheels, drums, bobbins, spools, rollers, cylinders, etc. The said rotation of the wheels may be either passive or active, i.e. the rotation may be induced by the linear motion of the fiber between the curved surfaces, or at least one of the wheels may be actively driven, e.g. by a motor; in this latter case, the rotation of the wheels can be used to induce linear motion in the fiber, so as to draw it from the preform. The stipulation that the wheels rotate in "mutually opposite senses" means that, relative to a certain viewing direction, one of the wheels rotates in a clockwise sense, whereas the other rotates in a counter-clockwise sense. The term "peripheral curved surface" refers to the surface around the perimeter of the wheel, which surface has a substantially circular cross-section when viewed in any plane drawn perpendicular to the wheel's rotational axis. This surface is ideally cylindrical, but it may also be (partially) conical or spherical, for example. The extent to which the fiber is "pressed" between the curved surfaces need only be enough to ensure that it is rolled therebetween when the wheels are moved back and forth, without fiber slip. The requirement that the wheels be "moved back and forth relative to one another" only refers to relative motion of the two wheels: whether such relative motion is achieved by moving only one or both wheels with respect to a fixed frame is a matter of choice.

The advantages of the inventive method are manifold. For example:

Because the moving fiber is pressed between the curved surfaces of the two wheels, it is unlikely to slip out from between them;

Rolling the fiber according to the inventive method allows it to be twisted to a very great extent, if so desired. For example, in the case of a coated fiber with a diameter of 250 µm, which is pressed between two cylindrical wheels rotating about mutually parallel axles, a relative parallel displacement of the axles of only 1.6 mm results in a full 360° twist of the fiber;

The inventive method does not cause the fiber to be excessively vibrated, since the wheels make uniform, controlled contact with the fiber.

An important aspect of the method according to the invention is that it achieves very substantial PMD reduction, whether the spin imparted to the fiber has a constant spatial period or is irregular. In tests of the new method, the inventors have produced single-mode fibers with a mean PMD value of 0.033 ps/km$^{1/2}$ (measured after cabling), which is very substantially less than the model value of 0.5 ps/km$^{1/2}$ quoted in the above-cited prior art; for reference purposes, similar fibers which were manufactured without any attempt at PMD reduction were often found to have PMD values up to 1 ps/km$^{1/2}$. In particular, the fact that the invention achieves such excellent results even for fiber-spin with a constant spatial period is of great advantage, since it removes the requirement to twist the fiber in an irregular manner (as in the prior art), with its attendant actuation and automation complications. Consequently, the back-and-forth motion of the wheels in the inventive method is allowed to be uniformly periodic, which is a considerable simplification with regard to the known method.

The mechanical contact between the fiber and the wheels preferably occurs at a point where the fiber has already been provided with a protective coating, since the risk of damage to the fiber is thus minimised. Twisting the fiber at such a point produces an associated twist in the entire length of fiber between the preform and the wheels, and thus also in that region (just below the preform) where the fiber is still hot. Protective coatings most often encountered in the art comprise, for example, a UV-cured resin, applied by drawing the fiber through a coating bath and subsequently exposing it to actinic radiation, or carboniferous material, applied by heating the fiber in the presence of an organic gas, such as ethene.

The invention can be successfully applied in conjunction with all fiber optic materials conventionally employed in the art. These include, for example, natural silica, synthetic silica and plastics, whether doped or undoped, and also various coating resins, such as UV-cured acrylate resins.

A preferential embodiment of the method according to the invention is characterised in that the curved surface of at least one wheel is coated with a flexible material which is softer that the material of the fiber. This facilitates the rolling of the fiber between the two wheels, since it guarantees good frictional contact between the fiber and the curved surface of the coated wheel. In addition, it helps minimise the risk of mechanical damage to the surface of the fiber. Needless to say, both wheels can be coated in this manner, if so desired. It should be noted that the absence of such a soft coating can be compensated for by increasing the pressure exerted by the wheels on the fiber. Alternatively, the curved surfaces of the wheels can be suitably roughened or profiled.

In an alternative embodiment, at least one of the wheels is made substantially in its entirety from a material which is softer than that of the fiber.

Exemplary soft materials for application in the embodiments discussed in the previous two paragraphs include, for example, many types of rubber, plastic, textile and felt. A specific such substance is the urethane rubber material VULCALAN K639 (Philips). Other such substances include, for example, polypropene, low-density polyethene, PVC, cotton lint, velvet, etc.

As already stated hereabove, the inventive method achieves excellent results, whether periodic or non-periodic spin is imparted to the product fiber. In the case of periodic spin, a particular embodiment of the new method is characterised in that the wheels rotate about axles which are pivoted to a connecting rod, the rod itself being pivoted about a reference point located between the two axles, a back-and-forth motion of the axles being achieved by levering the rod back and forth about the reference point. In such an embodiment, the rod can be periodically levered using, for example, a simple motor, and the amplitude of the levering motion will determine the amplitude of the twist to which the fiber is subjected. In a preferential embodiment of this particular method, a point on the rod is levered back and forth by connecting it via an arm to a non-central point on a driving wheel. The speed of the driving wheel will influence the period of the spin imparted to the fiber, for a given fiber drawing speed, and the radius to the non-central point will determine the spin amplitude.

It has already been discussed how twisting the fiber between the wheels in the inventive method will cause an associated twist in the portion of fiber between the wheels and the preform. In a similar manner, the portion of fiber between the wheels and the uptake reel will also be twisted. So as to prevent twisted fiber from being wound onto the uptake reel, a capstan can be incorporated in the fiber path between the wheels and the uptake reel. Such a capstan ideally has a circumferential V-shaped (or U-shaped) groove into which the fiber is seated, and the fiber preferably contacts the capstan over a sizeable fraction of its circumference (e.g. a quarter or more).

The inventive method can be used to produce a new type of optical fiber which the inventors have not been able to manufacture using the method known from the prior art. Such a fiber comprises a core portion which is surrounded by an optical cladding portion, itself surrounded by a protective coating, and is characterised in that the fiber demonstrates a spin about its longitudinal axis in alternately opposite senses, and that it comprises at least one longitudinal segment along which the magnitude of the spin is 360° (one full turn). This implies that the spin amplitude $\Phi$ in such an optical fiber will be at least 360°. In contrast, the known method has been found to produce a typical spin amplitude $\Phi$ of the order of only a few (tens of) degrees. The inventors have found that large spin amplitudes, such as are characteristic of the inventive fiber, produce greater PMD reduction than the much smaller spin amplitudes imparted by the known method.

Excellent results are obtained when the spin in the inventive fiber is a uniformly periodic function of longitudinal position along substantially the entire optical fiber. In particular, such a fiber is easy to manufacture, since the wheels employed in the inventive method can be allowed to move back and forth at a constant frequency, and can be left in contact with the fiber throughout the drawing operation.

A particular embodiment of the inventive optical fiber hereabove referred to is characterised in that the length $l_o$ of the said longitudinal segment does not exceed 0.33 m. This implies that the number of full spin turns per meter length of fiber is at least three (regardless of the direction of the turns). The inventors have found that such a fiber generally exhibits very low PMD. However, the condition $l_o \leq 0.33$ m is not a strict requirement for obtaining satisfactory PMD reduction.

It should be noted that the wheels employed in the method according to the invention need not be in constant contact with the moving fiber; if so desired, they may be retracted from the fiber at regular or irregular intervals, thereby allowing the occurrence of untwisted portions of fiber. Alternatively, the wheels can be left in contact with the fiber, but their back-and-forth motion can be interrupted, so that the fiber is no longer twisted between them. Needless to say, the wheels do not have to be of equal size or form, or comprise the same materials.

BRIEF DESCRIPTION OF THE DRAWINGS

The invention and its attendant advantages will be further elucidated with the aid of exemplary embodiments and the accompanying schematic drawings, not of uniform scale, whereby.

DESCRIPTION OF THE PREFERRED EMBODIMENTS

Embodiment 1

Figure 1:
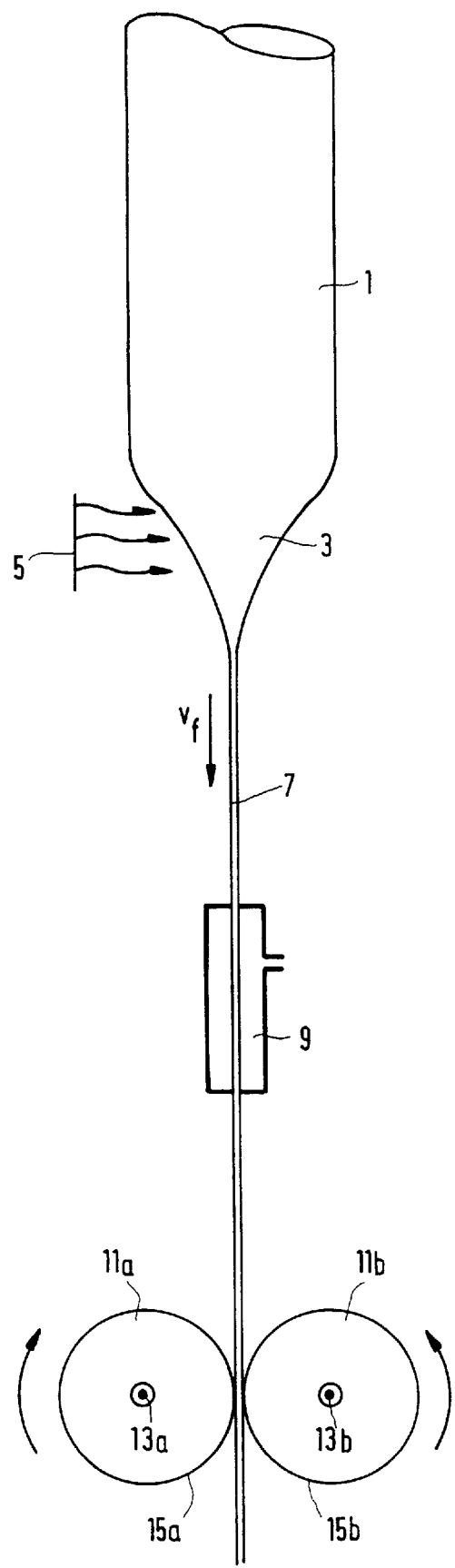
FIG. 1 is an elevational view of an apparatus for manufacturing an optical fiber according to the inventive method.
Figure 2:
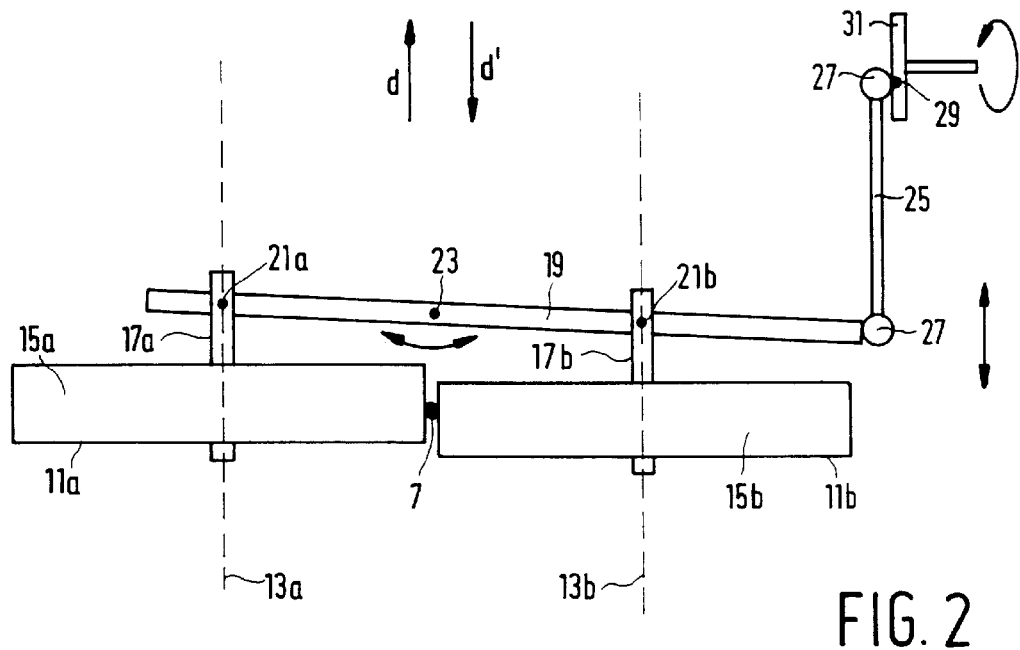
FIG. 2 is a plan view of part of the subject of FIG. 1.

FIGS. 1 and 2 pertain to a particular embodiment of the method according to the current invention, and depict various aspects of an apparatus suitable for enacting that method. Corresponding features in the two Figures are denoted by the same reference labels.

FIG. 1 depicts part of an apparatus for drawing an optical fiber 7 from a preform 1. An extremity 3 of the preform 1 is heated to a molten state by electrical means 5, and a fiber 7 is then drawn with a linear velocity $v_f$ from this extremity 3. When just drawn, the fiber consists of a core and one or more surrounding optical claddings.

The fiber 7 subsequently passes through coating means 9, where it is provided with a protective coating. Thereafter, in accordance with the invention, the fiber 7 is run between a pair of metal wheels 11a, 11b, which rotate in opposite senses about two different rotational axes 13a, 13b, respectively. Each of the wheels 11a, 11b has a respective peripheral curved surface 15a, 15b, which is here coated with a layer of VULCALAN K639 rubber. The wheels 11a, 11b are thus arranged that the fiber 7 runs substantially tangential to the curved surfaces 15a, 15b, and is pressed therebetween.

FIG. 2 renders a plan view of the wheels 11a, 11b, according to a particular embodiment. The peripheral curved surfaces 15a, 15b are cylindrical, having the respective axes 13a, 13b as cylindrical axes. The wheels 11a, 11b are rotatable about the respective axles 17a, 17b, which are pivoted to a connecting rod 19 at the respective pivot points 21a, 21b. The rod 19 is itself pivoted about a reference point 23, in this case situated half way between axes 13a, 13b.

An extremity of the rod 19 is connected to one end of an arm 25 via a swivel joint 27. The other end of the arm 25 is connected via a second swivel joint 27 to a non-central point 29 on a driving wheel 31.

The radius of the wheels 11a, 11b and the separation of the axes 13a, 13b are thus tailored that the fiber 7 is pressed between the curved surfaces 15a, 15b. If so desired, this may be achieved by employing elastic means to push the axles 17a, 17b toward one another (such elastic means, however, are unnecessary if at least one of the curved surfaces 15a, 15b comprises flexible material, such as a layer of rubber, and the separation of the curved surfaces is accurately set). By virtue of the fact that the fiber 7 is pressed between the curved surfaces 15a, 15b, the linear motion of the fiber 7 induces rotation of the wheels 11a, 11b, whereby wheel 11a rotates clockwise and wheel 11b rotates counter-clockwise (when viewed along the direction d). In other words, the rotation of the wheels 11a, 11b is, in this case, passive.

As the driving wheel 31 rotates, the arm 25 is caused to move back and forth along the direction d. This, in turn, causes the rod 19 to be levered back and forth about the reference point 23. As a consequence hereof, the axles 17a, 17b, and thus the wheels 11a, 11b, are moved back and forth along the axes 13a, 13b. Because the axles 17a, 17b are located on opposite sides of the reference point 23, the wheels 11a, 11b are moved in mutually opposite directions, i.e. if wheel 11a is moving in direction d, then wheel 11b is simultaneously moving in direction d', and vice versa.

Since the fiber 7 is pressed between the curved surfaces 15a, 15b, this back-and-forth motion of the wheels 11a, 11b will cause the moving fiber to be rolled back and forth relative to the surfaces 15a, 15b with a frequency f, thereby causing the fiber to be twisted about its longitudinal axis. While wheel 11a is moving in direction d, the fiber 7 will be twisted in a clockwise direction (as seen from above); on the other hand, while wheel 11a is moving in direction d', the fiber 7 will be twisted in a counter-clockwise direction.

Referring once again to FIG. 1, this twisting of the fiber 7 between wheels 11a, 11b will cause the entire length z of fiber 7 between the wheels 11a, 11b and the preform 1 to be twisted. In particular, a portion of the fiber 7 which is located just below the extremity 3 of the preform 1, and which is still molten, will also be twisted. As this portion moves further away from the preform 1, it cools off, and the twist in its material becomes permanent, whereafter it is referred to as a spin. This occurs before the said portion reaches the wheels 11a, 11b.

Returning now to FIG. 2, the amplitude $\Psi$ of the twist, i.e. the maximum angle $\psi$ through which the fiber 7 is twisted between the wheels 11a, 11b, is determined by the amplitude of the back-and-forth motion of the wheels 11a, 11b along the axes 13a, 13b. For a fiber 7 of diameter D, a relative displacement y of the wheels 11a, 11b along the axes 13a, 13b will result in a value:

$$\Psi = \frac{1}{2} \times 360 \, y/\pi D \text{ (degrees)}.$$

The spatial period of the twist, i.e. the length of fiber 7 drawn from the preform 1 during one complete back-and-forth oscillation of the wheels 11a, 11b, has the value:

$$L = v_f/f.$$

The value of $\Psi$ is thus spread over a length ½L of the fiber.

Since the fiber 7 is to some degree rotatable at the molten extremity 3 of the preform 1, it will co-rotate in response to the twist imparted by the wheels 11a, 11b. As a result, the spin amplitude $\Phi$, i.e. the maximum spin angle $\phi$ imparted to the fiber, will be smaller than the corresponding value of $\Psi$. In general, the exact value of $\Phi$ will depend on the values of $\Psi$, $v_f$, f, z, and the viscosity of the fiber material.

For example, for a silica fiber with D=250 µm (coated), y=5 mm, f=5.6 s$^{-1}$, $v_f$=5 m/s$^{-1}$ and z≈10 m, the inventors have obtained $\Phi$≈900° (2½ full turns), whereas the corresponding value of $\Psi$ is approximately 1150° (3.2 full twists). The spatial period L is 0.89 m, for both $\Phi$ and $\Psi$.

Embodiment 2

In an embodiment otherwise identical to Embodiment 1, at least one of the wheels 11a, 11b is actively rotated about the axes 13a, 13b (with the aid of, for example, an undepicted electric motor), and this rotation is exploited to impart the drawing speed $v_f$ to the fiber 7. In such a case, the angular velocity of the wheels 11a, 11b should be $2\pi v_f$.

Embodiment 3

Figure 4:
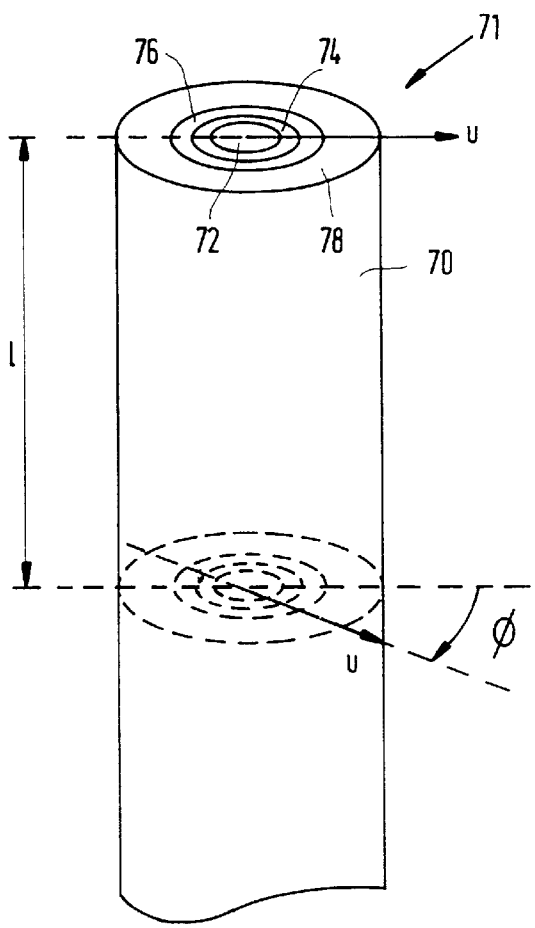
FIG. 4 gives a cross-sectional view of the subject of FIG. 3.
Figure 3:
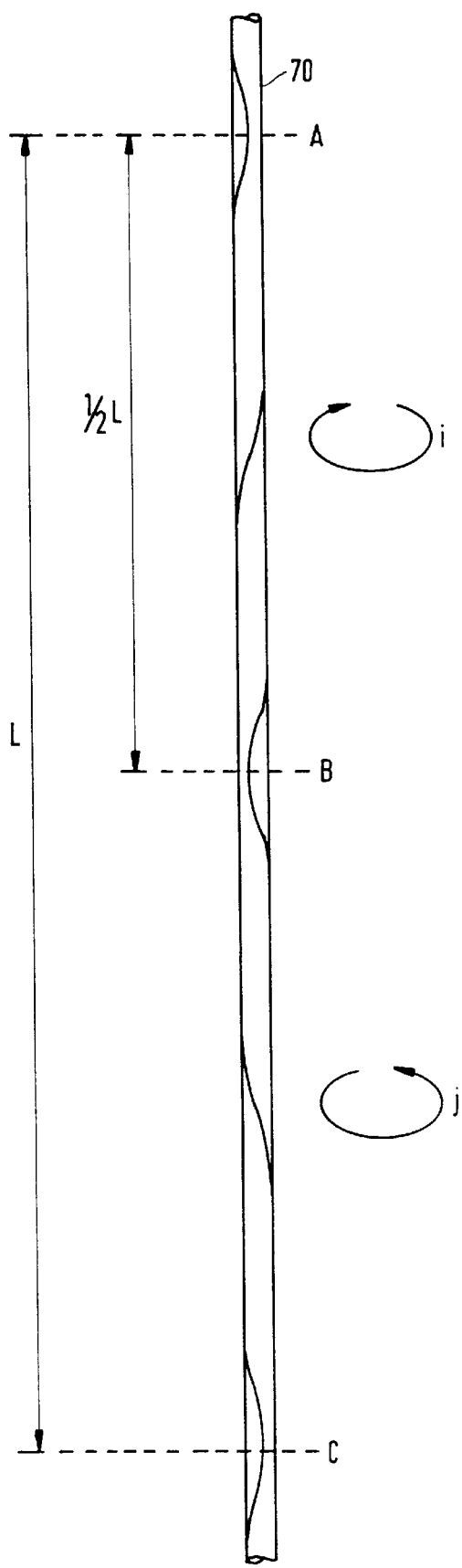
FIG. 3 renders an elevational view of part of an optical fiber according to the invention.

FIGS. 3 and 4 are schematic depictions of part of a particular embodiment of an optical fiber according to the invention. Corresponding features in the two Figures are denoted by the same reference labels.

FIG. 3 is a schematic elevational view of part of an optical fiber 70 manufactured in accordance with the current inventive method. The fiber 70 demonstrates an intrinsic mechanical spin $\phi$ which is a periodic function of the length of the fiber 70. This spin $\phi$ has alternately positive and negative polarity, attributable to the back-and-forth motion of the wheels 11a, 11b in FIGS. 1 and 2.

The spatial period L of the spin $\phi$ is that length of fiber 70 between consecutive points having an identical spin state (magnitude, sign and gradient of φ). As here depicted, the segment AC corresponds to a single spatial period L. This segment AC can be subdivided into two adjacent segments AB and BC, both of length ½L. In segment AB, the spin φ has the direction i (clockwise); in segment BC, on the other hand, the spin φ has the opposite direction j (counter-clockwise).

As here depicted, the fiber 70 demonstrates two full twists in each of the segments AB, BC: first clockwise and then counter-clockwise (looking downwards along the fiber). In this case, the amplitude Φ of the spin φ is thus 720°.

FIG. 4 renders a cross-sectional view of part of the subject of FIG. 3. The fiber 70 comprises a core portion 72 which is successively surrounded by an optical cladding portion 74, a mechanical cladding portion 76, and a protective coating 78. The refractive index of the core portion 72 exceeds that of the optical cladding portion 74. The mechanical cladding portion 76 corresponds to the use of a substrate tube and (optionally) at least one jacketing tube in the preform 1.

A reference radial vector u has been drawn at the depicted butt-end 71 of the fiber 70. This vector u should be imagined as remaining fixed with respect to the immediately surrounding fiber material. As one progresses along the fiber, the vector u will rotate due to the spin φ imparted to the fiber 70. As the distance l to the butt-end 71 increases, the value of φ will change, both in magnitude and sign. Assuming the butt-end 71 to be located at the point A in FIG. 3, then φ=Φ when l=½L (point B), whereafter φ will decrease again, becoming zero at l=L (point C).

This φ-cycle is repeated periodically along the fiber, either along the whole length or with interruptions at certain intervals, as desired.

Alternatively, a wholly non-periodic φ-variation may be imparted to the fiber, by ensuring an irregular back-and-forth motion of the wheels 11a, 11b (assuming a constant drawing speed $v_f$).

Embodiment 4

The inventors have developed an effective procedure for investigating the nature of the spin imparted to an optical fiber by the inventive method. In this procedure, the outer surface of the preform is provided with a short score-line extending substantially parallel to the preform's longitudinal axis. A test optical fiber subsequently drawn from this scored portion of preform will demonstrate a slight lateral asymmetry, which will co-rotate with the fiber material as the fiber is twisted.

When such a test fiber is chemically stripped of its protective coating and is then transversely irradiated by a laser beam (e.g. from a HeNe laser), the laser light produces a diffraction pattern on a screen placed behind the irradiated portion of fiber. The presence of the lateral asymmetry hereabove referred to produces a characteristic diffraction pattern with interference maxima and minima. These maxima and minima undergo a visible shift as the fiber is gently rotated about its longitudinal axis, by hand. By slowly scanning the laser beam along a given length of the fiber, and simultaneously monitoring the angle through which the fiber must be hand-rotated so as to keep the diffraction pattern constant, both Φ and L can be determined.

Embodiment 5

In an embodiment identical to Embodiment 3, the portions 72, 74, 76 and 78 are comprised as follows:

72: Synthetic (PCVD) silica, doped with approx. 1 at. % F and 5 mol. % $GeO_2$. Diameter: 9 μm.

74: Synthetic (PCVD) silica, doped with approx. 1 at. % F and 1 mol. % $GeO_2$. Diameter: 42 μm.

76: Natural silica. Diameter: 125 μm.

78: UV-cured acrylate resin. Diameter: 248 μm.

I claim:

1. A method of manufacturing an optical fiber, including drawing a fiber from a molten extremity of a preform and subsequently subjecting the fiber to a torque, thereby causing a portion of the fiber to be twisted about its longitudinal axis and to be endowed with a spin, wherein the improvement comprises:

providing a pair of axles about which a pair of wheels rotate in mutually opposite senses, each wheel having a curved peripheral surface, the axles being pivotably connected to a connecting rod at two spaced apart positions, the rod itself being pivotable about a reference point located between the two axles, arranging the fiber and the wheels such that the fiber runs substantially tangential to the curved surfaces and is pressed therebetween, and applying said torque to the fiber by moving the wheels back and forth relative to one another in a direction substantially perpendicular to the fiber so as to cause the fiber to be rolled back and forth between their curved surfaces, said moving being accomplished by pivoting the rod back and forth about the reference point.

2. A method according to claim 1, wherein the back-and-forth moving of the wheels is uniformly periodic.

3. A method according to claim 1, further comprising providing the curved surface of at least one wheel with a coating of flexible material which is softer than the fiber.

4. A method according to claim 3, wherein the flexible material is selected from the group consisting of rubber, plastic, textile, and felt.

5. A method according to claim 1 wherein said pivoting the rod back and forth is accomplished by moving a point on the rod via an arm connected to a non-central point on a driving wheel.

6. A method according to claim 2, further comprising providing the curved surface of at least one wheel with a coating of flexible material which is softer than the fiber.

* * * * *